(12) United States Patent
Clarke et al.

(10) Patent No.: US 7,894,594 B2
(45) Date of Patent: *Feb. 22, 2011

(54) COMMUNICATIONS SYSTEM WITH INTERFACE FOR ENABLING COMMUNICATION OF ALERTS TO MOBILE WIRELESS COMMUNICATIONS DEVICES

(75) Inventors: David James Clarke, Redmond, WA (US); Darren L. Gardner, Issaquah, WA (US)

(73) Assignee: Teamon Systems, Inc., Issaquah, WA (US)

( * ) Notice: Subject to any disclaimer, the term of this patent is extended or adjusted under 35 U.S.C. 154(b) by 903 days.

This patent is subject to a terminal disclaimer.

(21) Appl. No.: 11/355,115

(22) Filed: Feb. 15, 2006

(65) Prior Publication Data

US 2006/0172726 A1 Aug. 3, 2006

Related U.S. Application Data

(63) Continuation of application No. 10/785,657, filed on Feb. 24, 2004, now Pat. No. 7,043,240.

(51) Int. Cl.
*H04M 7/00* (2006.01)
*H04M 3/42* (2006.01)
(52) U.S. Cl. .............................. 379/221.14; 455/414.1
(58) Field of Classification Search .............. 455/414.1; 379/88.12, 88.22
See application file for complete search history.

(56) References Cited

U.S. PATENT DOCUMENTS

| | | | | |
|---|---|---|---|---|
| 5,457,680 A | * | 10/1995 | Kamm et al. | 370/332 |
| 5,742,668 A | * | 4/1998 | Pepe et al. | 455/415 |
| 5,742,905 A | * | 4/1998 | Pepe et al. | 455/461 |
| 6,061,718 A | * | 5/2000 | Nelson | 709/206 |
| 6,125,281 A | | 9/2000 | Wells et al. | 455/466 |
| 6,154,788 A | * | 11/2000 | Robinson et al. | 710/8 |
| 6,397,259 B1 | * | 5/2002 | Lincke et al. | 709/236 |
| 6,457,879 B1 | * | 10/2002 | Thurlow et al. | 709/206 |
| 6,567,416 B1 | * | 5/2003 | Chuah | 370/418 |
| 6,584,564 B2 | * | 6/2003 | Olkin et al. | 713/152 |
| 6,590,588 B2 | * | 7/2003 | Lincke et al. | 715/744 |
| 6,600,915 B1 | * | 7/2003 | Wedeking | 455/410 |
| 6,600,930 B1 | * | 7/2003 | Sakurai et al. | 455/414.3 |
| 6,610,105 B1 | * | 8/2003 | Martin et al. | 715/202 |

(Continued)

OTHER PUBLICATIONS

Oracle9iAS Wireless Datasheet, 2001; http://otn.oracle.com/products/iaswe/htdocs/datasheet.pdf.

(Continued)

*Primary Examiner*—Joseph T Phan
(74) *Attorney, Agent, or Firm*—Allen, Dyer, Doppelt, Milbrath & Gilchrist, P.A.

(57) ABSTRACT

An interface device, method and computer-readable program includes a proxy operative as an agent for communicating with a plurality of mobile wireless devices using different operating protocols. A device information module is operative with the proxy and determines functional features of a wireless mobile communications device and selects a configuration file for configuring the proxy to interface with the device and enable communications of any desired alerts.

25 Claims, 3 Drawing Sheets

U.S. PATENT DOCUMENTS

| | | | |
|---|---|---|---|
| 7,123,933 B2 * | 10/2006 | Poor et al. | 455/552.1 |
| 7,269,405 B2 * | 9/2007 | Poor et al. | 455/403 |
| 7,725,103 B2 * | 5/2010 | Boss et al. | 455/420 |
| 2002/0129354 A1 | 9/2002 | Bryan et al. | 717/176 |
| 2002/0183080 A1 * | 12/2002 | Poor et al. | 455/466 |
| 2003/0050984 A1 | 3/2003 | Pickup et al. | 709/206 |
| 2004/0024853 A1 * | 2/2004 | Cates et al. | 709/223 |

OTHER PUBLICATIONS

Content Delivery for Wireless Applications, Birlasoft, 2003; http://www.birlasoft.com/white/wirelesscontentdelivery.pdf.

\* cited by examiner

US 7,894,594 B2

COMMUNICATIONS SYSTEM WITH INTERFACE FOR ENABLING COMMUNICATION OF ALERTS TO MOBILE WIRELESS COMMUNICATIONS DEVICES

This application is a continuation of Ser. No. 10/785,657 filed on Feb. 24, 2004 now U.S. Pat. No. 7,043,240, the disclosure of which is hereby incorporated by reference in its entirety.

FIELD OF THE INVENTION

The present invention relates to the field of communication systems, and more particularly, the present invention relates to a system and method for communicating with and providing alerts to a wireless mobile communications device.

BACKGROUND OF THE INVENTION

Users of electronic mail and messaging systems often want to be notified of an event or other alert, which could be a notification that an e-mail message has been received in a mailbox or be a notification regarding a telephone message, stock quote notification, or other notification regarding a received message. Sometimes a user may have a preferred medium or communications format for receiving the alert, including an e-mail Short Messaging Service (SMS) message, a Wireless Application Protocol (WAP) message, or other type of message to be delivered in a communications format that is preferred by the user at the destination or target address.

There have been a number of prior art proposals for solving these problems and providing alerts for events. For example, sometimes an alert is delivered to a distribution engine in an output communications format desired by the user. This distribution engine, however, performs no transformation of an alert into a communications format desired by a user or destination address. Thus, any alert must be input in the desired format. In yet another proposal, the input format to an alert system can originate from a variety of sources, and can be in the form Hypertext Transfer Protocol (HTTP), local files, File Transfer Protocol (FTP), Structured Query Language (SQL), and other multiple formats. In this prior art proposal, the alert system appears to have access to a user's personal information and settings, but there is not transformation into a desired communications format.

Another drawback is that different manufacturers support different types of alert messages, such as created by WAP gateways. Each brand of wireless mobile communications device often plays an important role in determining the functional features and characteristics of a device, which impacts how an alert is to be received, or whether any alert should be transmitted. Many service providers and other communication system providers view a client string in an attempt to configure a server where other devices support a proper protocol. Alerts are typically to be forwarded to a device. This has not always been found advantageous.

SUMMARY OF THE INVENTION

It is therefore an object of the present invention to overcome the disadvantages of prior art communication systems that provide alerts as addressed above.

The present invention advantageously provides an interface device for a communications system that uses a proxy operative as an agent for communicating with a plurality of mobile wireless communications devices using different operating protocols. A device information module is operative with the proxy as a front-end proxy module, for example, of a mobile office platform and a protocol interface device, for determining functional features of a wireless mobile communications device and selecting a configuration file from a database for configuring the proxy and enabling communications of any desired alerts. The proxy can be operative as part of the mobile office platform having a mail agent, appropriate databases and operative with appropriate protocols for communicating with wireless mobile communications devices. Communication can be accomplished through a protocol engine module or other agent for communicating with data storage devices, such as email clients, using respective operating protocols. The proxy is part of a front-end proxy module of a protocol interface device and mobile office platform.

In accordance with the present invention, the device information module can operative for determining functional features of the wireless mobile communications device by viewing intermediate proxies and header information received from the wireless mobile communications device. This information can also include client, brand and gateway information. The device information module can be operative for determining which functional features are enabled for different wireless mobile communications devices. A configuration file database can also be operative with the device information module and store configuration files used for configuring the proxy based on functional features of the wireless mobile communications device. The device information module is also operative for determining the brand of the wireless mobile communications device.

In yet another aspect of the present invention, the knowledge database stores data relating to functional features of different wireless mobile communications devices used for determining configuration files to be selected by the device information module. The database can include records for device types and brands of different communications devices. The database can also include data to be used for selecting a default configuration for unknown devices.

A method aspect of the present invention is also set forth for communicating with a wireless mobile communications device. The method comprises the steps of receiving communications from a wireless mobile communications device; determining functional features of the wireless mobile communications device; and configuring a communications interface with the wireless mobile communications device based on determined functional features to enable communications of any desired alerts to the device.

A computer-readable medium for interfacing at least one wireless mobile communications device is also set forth and comprises a proxy module operative as an agent for communicating with a plurality of mobile wireless communications device using at least one different operating protocol. A device information module is operative with a proxy module for determining functional features of the device and selecting a configuration file for configuring the proxy module to interface with the wireless mobile communications device and enabling communications of any desired alerts.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention is advantageous and provides an interface device for a communications system that includes a front-end proxy module, for example, as part of a protocol interface device of a mobile office platform. Proxies are coupled to a protocol engine module and operative as agents for communicating with a plurality of mobile wireless communications devices using different operating protocols. The protocol engine module communicates with data storage devices, such as email providers or servers, using respective operating protocols. A device information module, for example, as part of the protocol interface device, is operative with the front-end proxy module and determines functional features of a wireless mobile communications device and selects a configuration file for configuring the proxy interface with the wireless mobile communications device and enabling communications of any desired alerts.

The protocol interface device can be part of a server operative as an agent, such as a mobile office platform, having a mail agent and appropriate databases and processors. The present invention includes the databases and processing to determine the functional features or characteristics of wireless mobile communications devices using client strings and intervening proxies, including client, brand and gateway instead of only client strings. It is possible to look only at the client string and intervening proxies in the middle to determine the functional features necessary for use in the present invention.

There now follows a description of a protocol interface device having a front-end proxy module, protocol engine module and operative with data storage devices, such as mail systems, and clients as mobile wireless communications devices and the device information module of the present invention. There then follows a description of an example of a flow chart for the method of the present invention and an exemplary mobile wireless communications device that can be used in the present invention.

Figure 1:
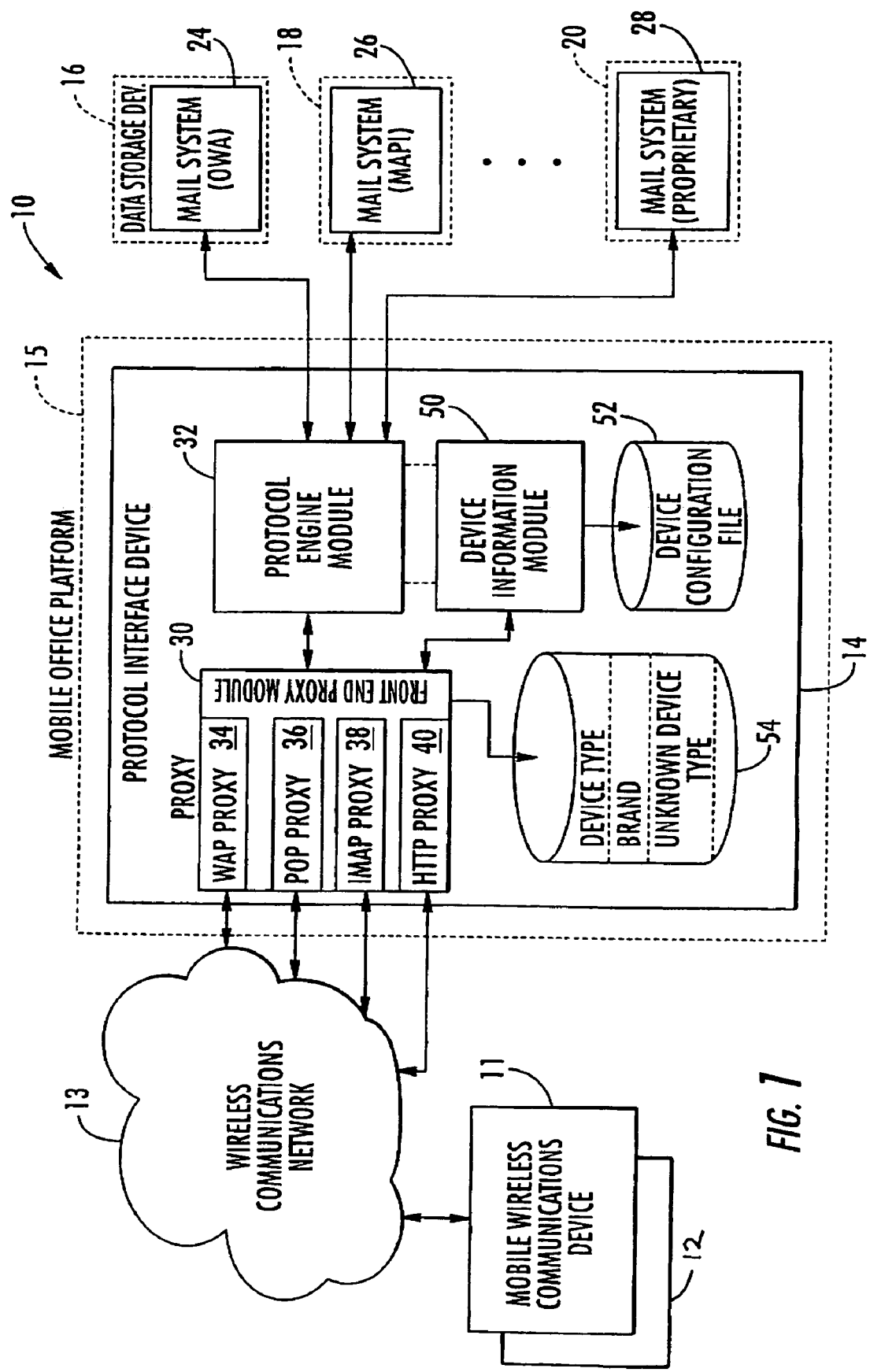
FIG. 1 is schematic block diagram illustrating an example of a protocol interface device having a device information module for use in the present invention.

Turning now to FIG. 1, a communications system 10 of the present invention includes a protocol interface device 14, for example, of a mobile office platform 15, that provides access to a plurality of data storage devices or systems 16, 18, 20, which can be email servers or similar devices. The communications system 10 illustratively includes a plurality of communications devices, namely a mobile wireless communications device 11. Wired devices could be used with the present invention, of course. By way of example, various mobile wireless communications devices may be used in accordance with the invention, such as personal data assistants (PDAs), cellular telephones, etc. An exemplary mobile wireless communications device 11 suitable for use with the present invention is described in the example provided below with reference to FIG. 3. Moreover, examples of wired communications devices include personal computers, telephones, fax machines, etc. Of course, numerous wired and wireless devices may be used.

The communications device 11 typically include software clients, which are software modules or applications that operate on or in conjunction with their respective communications device to provide access to data stored at one or more of the data storage devices 16, 18, and 20 through the protocol interface device 14. Those skilled in the art will appreciate that such communications devices also include further components and/or software modules, which have not been explicitly shown in FIG. 1 for clarity of illustration. With respect to the mobile wireless communications device 11, its software client communicates with the protocol interface device 14 via a wireless communication network 13, and perhaps other networks as well (e.g., a public switched telephone network (PSTN) or the Internet), as will be appreciated by those skilled in the art.

The various functions and operations of the protocol interface device 14 are preferably implemented in software operating thereon, or in conjunction therewith. The protocol interface device 14 illustratively bridges the software clients of the communications devices 11, 12 and the data storage devices 16, 18, 20. Communications between the protocol interface device 14, the communications devices 11, 12, and the data storage devices 16, 18, 20 are preferably via a wide area network (WAN) such as the Internet. That is, the communications devices 11, 12 may communicate with the protocol interface device 14 via the Internet, as noted above, and so too may the protocol interface device communicate with the data storage devices 16, 18, 20.

Of course, other implementations are also contemplated. For example, the protocol interface device 14 may be implemented in a private network that also includes the data storage devices 16, 18, 20, the communications devices 11, 12, or both the data storage devices and the communications devices (e.g., in a WAN). It should be noted that the present invention is in no way limited to any particular connection or communication scheme.

The data storage devices 16, 18, 20 store data to be accessed by the software clients of the communications devices 11, 12. Although some software clients are configurable to access directly certain types of data storage devices, they are often data system specific or protocol specific, as described briefly above. More particularly, on constrained electronic devices such as the mobile wireless communications device 11, processor power, memory resources, and communication channel characteristics may preclude the installation and operation of software clients having the same capabilities as those commonly used on desktop and laptop computer systems, for example. In addition, while the installation of multiple software clients for accessing data storage devices associated with different protocols is feasible for desktop and laptop computer systems, providing multiple-protocol support on such constrained devices may not be possible.

The data storage devices 16, 18, 20 are accessible using different operating protocols or access schemes. As such, the protocol interface device 14 accesses the data storage devices 16, 18, 20 via an operating protocol supported by respective data storage devices, and provides data to the communications device 11, 12 via a respective client-supported operating protocol. The protocol conversion functionality of the protocol interface device 14 provides a unified approach to support access to multiple types of data system. As described in further detail below, the protocol interface device 14 provides an "any-to-any" bridge between different protocols or access schemes.

This protocol interface device 14 bridges different types of communications devices with different types of data storage devices. In the illustrated embodiment, data storage devices are systems/servers for storing electronic mail (e-mail). However, it should be noted that the present invention is not limited to mail system access. Each of the mail systems 24, 26, 28 supports a different operating protocol or access scheme. More particularly, the mail system 24 supports Outlook Web Access (OWA), the mail system 26 supports Microsoft Messaging Application Programming Interface (MAPI), and the mail system 28 supports a proprietary protocol, such as that used by America Online (AOL), for example.

The protocol interface system 14 illustratively includes a proxy as a front-end proxy module 30. The front-end proxy module 30 illustratively includes other sub-units or proxy modules 34, 36, 38, 40, which respectively support the Wireless Application Protocol (WAP), the Post Office Protocol (POP), the Internet Message Access Protocol (IMAP), and the Hypertext Transfer Protocol (HTTP) for communication with clients.

The front-end proxy module 30 also communicates with a protocol engine module 32. The protocol engine module 32 translates OWA, MAPI, the proprietary protocol of the mail system 28 (and other protocols, if desired) into a format compatible with the front-end proxy module 30. To this end, a respective interface connector module could be coupled to a protocol engine module 32 for each of the operating protocols used by the mail systems 24, 26, 28. In a preferred embodiment, the front-end proxy module 30 and the protocol engine module 32 are extensible or expandable to accommodate additional operating protocols as they become available, as will also be discussed further below.

In operation, a user accesses a mailbox on one of the mail systems 24, 26, 28 through client software on his communications device. For example, a WAP browser on a mobile wireless communication device communicates with the WAP proxy module 34 to access the mail system 24. Access commands or instructions received by the WAP proxy 34 are converted into a format compatible with the protocol engine module 32. Communications between the front-end proxy module 30 and the protocol engine module 32 are preferably achieved via a common interface protocol, which may be a proprietary protocol or an established public protocol.

The protocol engine module 32 then translates the access commands or instructions received from the front-end proxy module 30 into a protocol associated with the mail system to be accessed (e.g., OWA for the mail system 24). Data received from the mail system (e.g., email messages, a list of new messages, calendar appointments, tasks, etc., depending on the particular mail system), the features that its access protocol supports, and the nature of the access command are translated into the common interface protocol and transferred to the front-end proxy.

The active proxy module (i.e., the WAP proxy module 34 in the present example) then formats the received data, or at least portions thereof, for the requesting client. Further commands from the client are also translated by the protocol interface device 14. Access commands from other types of clients are similarly processed. It should be noted that several mail systems may be accessed in response to a single access command, where a user has enabled multiple mailbox access through the protocol interface device 14.

The protocol interface device 14 thus allows clients using different operating protocols to access the mail systems 24, 26, 28, which also use different operating protocols. Access commands such as move, delete, create, send, fetch, and view, for example, that are generated at a client affect the data stored at the mail systems 24, 26, 28 instead of copies of the data. Through the protocol interface device 14, a client compatible with any one of the proxy modules 34, 36, 38, 40 is provided access to one or more of the mail systems 24, 26, 28. The client itself advantageously need not support the access protocol or scheme associated with the mail system(s) to be accessed.

Since the mail system protocol and the client protocol need not be compatible, feature support between the protocols may be different. For example, a POP client does not support the same features as OWA. The interface protocol used between the protocol engine module 32 and the front-end proxy module 30 is preferably designed to be able to represent a desired number of protocol-supported elements or features for a desired operating protocol. More specifically, the common interface protocol is preferably able to represent all protocol-supported elements for the most "capable" protocol (OWA in the present example), to provide the broadest possible feature support. Further still, the common interface protocol may support a full feature set across all supported protocols, if desired.

By way of example, the common interface protocol may be a proprietary protocol based on the Web-based Distributed Authoring and Versioning (WebDAV) protocol. It should be noted that the software clients need not initiate data access requests in all embodiments. For example, in some embodiments the protocol interface device 14 may include (or communicate with) a polling or aggregation engine module (not shown) that prompts the protocol engine module 32 to aggregate messages for respective users from the mail systems 24, 26, 28 at predetermined intervals, as will be appreciated by those skilled in the art. The protocol engine module 14 would then cooperate with the front-end proxy module 30 to provide the aggregated messages to the respective software clients, as described above. Additionally, the front-end proxy module 30 need not communicate directly with the communications devices 11, 12 in all embodiments, but it may instead communicate therewith via an intervening mail system or server, for example. Thus, in the case where an aggregation engine module is used, the aggregated messages may be first transferred by the front-end proxy module 30 to an intervening mail server, which in turn provides the messages to the appropriate communications device, as will also be appreciated by those skilled in the art. Here again, the front-end proxy module 30 would use the appropriate protocol(s) supported by such intervening mail server for communicating therewith.

The front-end proxy module can include different proxy modules and a renderer module and an extensible style sheet language transformation (XLT) engine module, together with a memory or template store and a flow controller module with handlers. The proxy module "fronts" the protocol engine module and translate respective operating protocols for different client types. For example, a WAP proxy module can provide information retrieved from different handlers in the form of WML documents targeted for display on devices, such as cell phones and PDA's. A POP proxy can make use of at least some of the same proxy components, including a flow controller module and renderer module to render data in the form required by a POP protocol.

The same core services can be used to route traffic, excess data and render data. Data access requests can be obtained from a client and passed to an appropriate proxy module 34, 36, 38, 40 using standard mechanisms for the client protocol. For a WAP client, for example, parameters are passed via a query string and/or formed variable. The WAP proxy module 34 can determine a component identifier (which identifies a target item such as a mail folder), and action identifier (which identifies an action to be performed), and any parameters based on data in the request. The case of WAP, the component and action identifiers are passed in the query string or form. Other parameters in the query string form a package into a parameter list.

The protocol interface device 14 of the present invention also includes a device information module 50 operative with a device configuration file database 52. A knowledge database 54 has data files relating to device type, unknown device type for default configurations, account information and a brand table database. The front-end proxy module is operative with the knowledge database and, of course, as explained before, is operative as an agent for communicating with the plurality of wireless mobile communications devices as noted before. The device information module 50 is operative with the front-end proxy module 30 for determining functional features of a wireless mobile communications device 11 and selecting a configuration file from the device configuration file database 52 and configuring the front-end proxy module to interface with the wireless mobile communications device and enable communications of any desired alerts that could be dependent upon the brand name of the wireless mobile communications device and WAP gateway.

In one aspect of the present invention, the device information module 50 is operative for determining functional features of the wireless mobile communications device 11 by checking intermediate proxies and header information received from the wireless mobile communications device. This information could include client, brand and gateway information. Different functional features can be enabled and these can be determined. The configuration file database 52 is operative to be queried by the device information module 50 and stores configuration files used for configuring the front-end proxy module based on functional features of the wireless mobile communications device.

The database 52 also includes data relating to the device type and brand and data for unknown devices. This data can be used for selecting a default configuration. Information can be stored regarding the wireless mobile communications device for future processing when further features of a device are obtained. Features can be obtained by reviewing intermediate proxies and header information received from the wireless mobile communications device.

As noted before, the device information module determines device type and matches configuration files. Brand can play an important role in determining characteristics and functional features of any mobile wireless communications device and the client, brand and gateway can be used. Brand can aid in determining what templates can be used, for example, for using IMAP, hotmail and other templates. This can be used for the discovery of the device type for sending alerts. If an unrecognized device type is located, then a default profile can be given. Information can be stored for later processing and as new features are set in the database, it can give the right functionality and configuration file to allow the client interface to be established. The system can also determine if alerts are desired and allow a user to set up the specific types of alerts and capture a type of proxy. Other traffic can be accessed through a web browser. The knowledge database is maintained to give the best features to a device based on device type, brand and other functional features.

The device information module loads a configuration file and has header names and files to match a correct configuration file. The device information module can then send the header information to a database for comparison with the brand type to obtain new features. It is possible, of course, to combine the database and configuration modules.

A given configuration file could be used for a group of wireless devices. The header from each client would identify the client. For example, in the WAP world, the WAP gateway would be involved to determine what type of templates or alerts to send to a client. This needs to be persistent when a client is not "on-line." The WAP gateways could also be different for different manufacturers. For example, some may not support WAP push-off capability. It is possible to use a combination of headers to send data and it is possible to add characteristics "on-the-fly," including brand and persistent repositories. Sometimes the templates may not be "in sync" with the database and the default can be overridden at a client. It is also possible to discover a device whether alerts or generated or not.

It should be understood that the software and programming used for the present invention can vary, and different applications can be used. The mobile office platform 16 and its associated components as described can use web services technology and include different application services used by those skilled in the art. Web services could include a combination of programming and data, which are available from a web server for web users, or the use of other web-connected programs as provided by an application service provider. Web services could use an extensible mark-up language (XML) as a standard for formatting data to be communicated.

Any type of arrangement can be used to access the front-end proxy module as part of a mobile office platform, including a peer-to-peer arrangement, a central server, or other architecture and line or wireless communications. Also, middleware could be used. Data formats could be standardized and data exchanged using the extensive mark-up language (XML), which is a foundation for the web services description language (WSDL). Different web servers could be used, including the open source Apache or Microsoft's internet information server (IIS). Other web services could include Novel's web server for users of its netware operating system or the IBM family of Lotus domino service, for example, for IMB's OS/390 and AS/400 customers. Naturally, any web server should be able to download requests for file transfer protocol (FTP) files in a preferred embodiment.

The front-end proxy module 30 as part of the protocol interface device 14 and mobile office platform 15 can have various import agents that are designed to retrieve configuration data from email clients. The mobile office platform could include a Messaging Application Programming Interface (MAPI) to retrieve any configuration data for a MAPI-compliant email client. MAPI provides the application programming interface (API) to ensure system independence for messaging applications. A layer of functionality could be provided between applications at any underlying messaging systems and act as messaging middleware. MAPI-compliant applications could communicate through a MAPI subsystem to MAPI service providers that perform requested actions for clients and pass data back through a MAPI system to a MAPI client. Any mailbox configuration data could reside in a configuration registry of the user system. In other example embodiments, data could reside in email client specific configuration storage.

In any user system, some mail clients can access source mailboxes that use the Post Office Protocol (POP) or Internet Mail Access Protocol (IMAP). POP, of course, is the internet mail server protocol that provides incoming message storage. The more recent protocol is POP3. POP is operative with a Simple Mail Transfer Protocol (SMTP). Any mail server could run both protocols if it is to receive, store and forward messages. The SMTP protocol exchanges messages from one mail server to another and hands messages to the required POP server for an email mailbox. A POP server can receive a message and hold it until another POP server is available. The IMAP version 4 also uses the SMTP transport mechanism, but it is a more flexible protocol because IMAP allows users to store mail on a mail server without downloading all new messages to a local machine. Internet mail service, of course, run SMTP and either POP or IMAP and receives incoming messages from any source without identity checking. Thus, mail can be selectively downloaded and read, message headers reviewed, hierarchical message stores built, an address book supported, and documents linked, authenticated and searched.

The mobile office platform 15 could generate configuration data objects and format data objects using an extensible mark-up language (XML) for submission to various XML-compliant web services. The server and/or web service could be a simple object access protocol (SOAP) compliant service.

XML, of course, as an extensive mark-up language, is a subset of the standard generalized mark-up language (SGML) and would allow data to be stored and published on websites and be richer in presentation. Custom tags could be created to define the content of documents. Common information formats could be created and the format and data shared on the internet, corporate internets and/or other networks. The mark-up symbols in XML could be unlimited and self-defining. The channel definition format (CDF) could describe any channel and a specific CDF file can contain data that specifies an initial web page and how it can be updated.

SOAP allows one program running in one kind of operating system to communicate with the program in the same or another type of operating system by using HTTP and XML for information exchange. SOAP could specify how to encode an HTTP header in an XML file, thus, allowing one computer to call a program in another computer and pass data, while also dictating how it can return a response. SOAP is advantageous to allow data to pass through firewall servers that screen-out requests other than those for known applications to a designated port. SOAP is an XML-based protocol that has at least three parts, including: (a) an envelope to define a framework for describing what is in a message; (b) a set of encoding rules for expressing application-defined data types; and (c) a convention for representing remote procedure calls and responses.

The front-end proxy module 30 and other components of the protocol interface device 14 and mobile office platform could include software that is implemented as an ActiveX control as a component object model (COM) and provide a framework for building software components that communicate with each other. ActiveX controls could be automatically downloaded and executed by a web browser. Distributed object applications could be built in active web pages and ActiveX controls could be downloaded to different browsers and clients. ActiveX controls could be held in a web browser as a container and distributed over an internet or corporate intranet. ActiveX controls could also manage and update web content and client systems and work closely with a user interface of a targeted operating system. Java applets or similar component objects could also be used instead of ActiveX controls. It should be understood for purposes of the present invention that an object model control could also be any type of dynamic link library (DLL) module that runs in a container as an application program using a component object model program interface.

Figure 2:
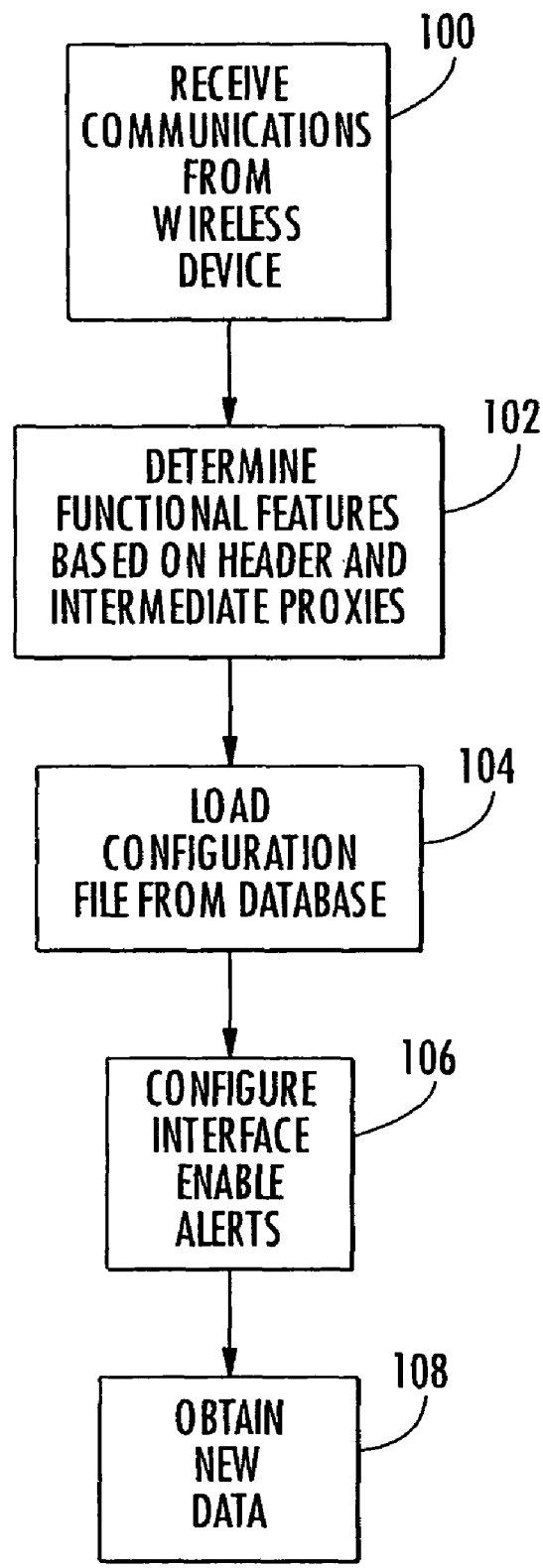
FIG. 2 is a flow chart illustrating an example of a method of the present invention.

FIG. 2 is a high level block diagram showing an example of the method of the present invention. The reference numerals begin in the 100 series. As shown in FIG. 2, communications are received from a wireless mobile communications device (block 100). The functional features of the wireless mobile communications device are determined based on at least the header and intermediate proxies (block 102). A configuration file can be loaded from a configuration file database (block 104) and the communications interface with the wireless mobile communications device configured to enable communications of any desired alerts (block 106). New data regarding functional features of a device can be obtained and stored for enabling other functional features and communications (block 108).

An exemplary hand-held mobile wireless communications device 1000 that can be used in the present invention is further described in the example below with reference to FIG. 3. The device 1000 includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

Figure 3:
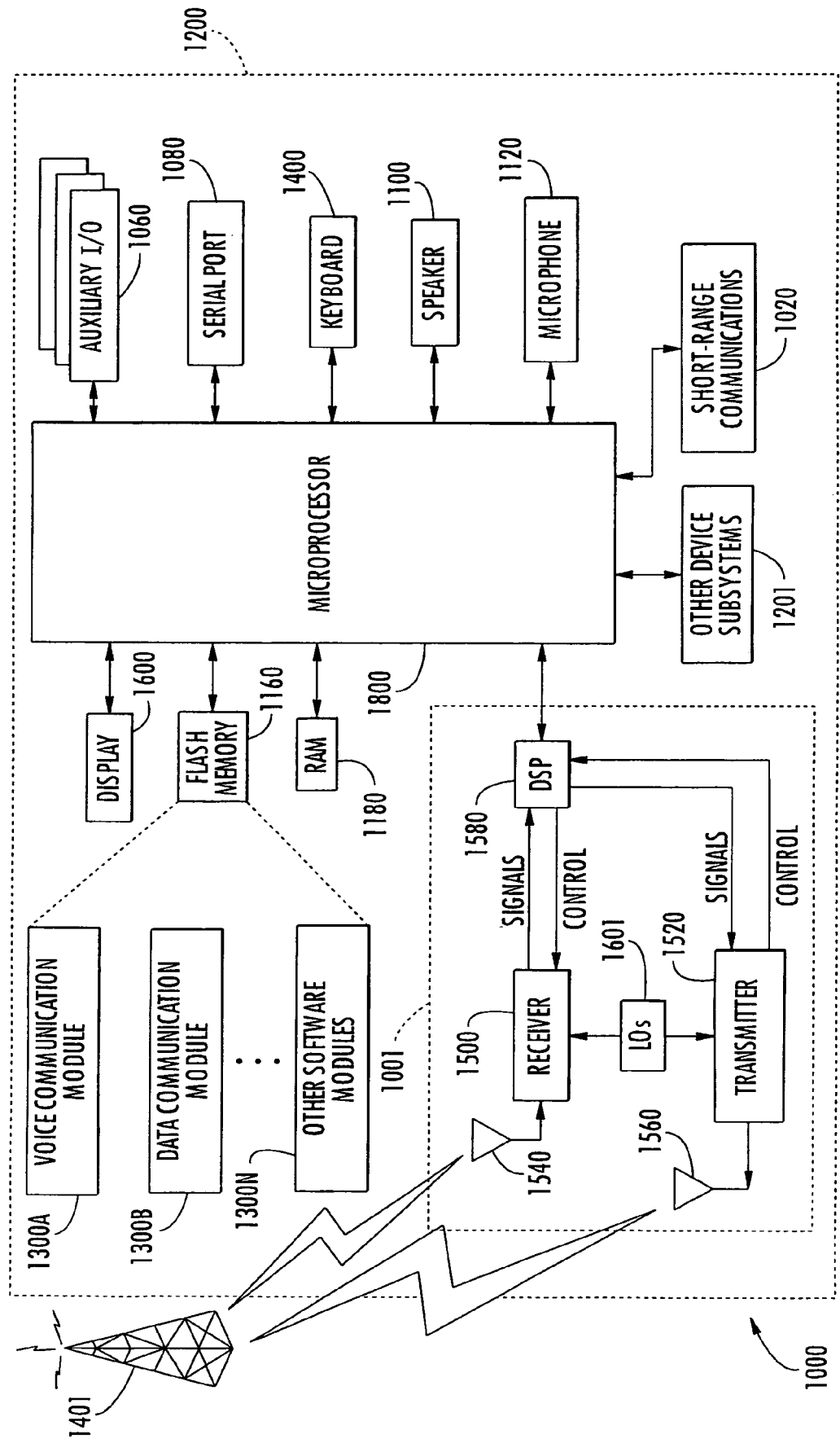
FIG. 3 is a schematic block diagram illustrating an exemplary mobile wireless communications device for use in the present invention.

In addition to the processing device 1800, other parts of the mobile device 1000 are shown schematically in FIG. 3. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system. Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device.

The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An interface device for a communications system comprising:
   a front-end proxy module operative as an agent for communicating with a plurality of wireless mobile communications devices using different operating protocols and with a plurality of data storage devices using respective ones of different operating protocols;
   a knowledge database that stores data relating to functional features of different wireless mobile communication devices that can communicate with the front-end proxy module;
   a device information module operative with the front-end proxy module; and
   a configuration file database for storing configuration files used for configuring the front-end proxy module based on functional features of the wireless mobile communications device, wherein said configuration file database is operatively connected to said device information module for allowing said device information module to query said configuration file database and selecting a configuration file for configuring the front-end proxy module to interface with the wireless mobile communications device and enable communications of any desired alerts that are notifications indicative of an event based upon at least a commercial brand name of a corresponding one of the plurality of wireless mobile communications devices.

2. An interface device according to claim 1, wherein said device information module is operative for determining functional features of the wireless mobile communications device by intermediate proxies and header information.

3. An interface device according to claim 1, wherein said device information module is operative for determining which functional features are enabled for different wireless mobile communications devices.

4. An interface device according to claim 1, wherein said device information module is operative for determining the commercial brand name of the wireless mobile communications device.

5. An interface device according to claim 1, wherein said database includes data relating to the device type and commercial brand name of different wireless mobile communications devices.

6. An interface device according to claim 1, wherein said database includes data relating to unknown devices used for selecting a default configuration.

7. An interface device according to claim 1, wherein said device information module is operative for selecting a default configuration for unknown devices.

8. An interface device according to claim 1, wherein said plurality of data storage devices comprise servers that store email messages.

9. A communications system comprising:
a plurality of data storage devices each using at least one of a plurality of operating protocols;
a wireless mobile communications device for accessing at least one of said plurality of data storage devices;
an interface device comprising
a protocol engine module for communicating with said plurality of data storage devices using respective operating protocols,
a front-end proxy module coupled to said protocol engine module and operative as an agent for communicating with said plurality of mobile wireless devices using at least one different operating protocol, and
a knowledge database operatively connected to said front-end proxy module and storing data relating to functional features of different wireless mobile communication devices that can communicate with the front-end proxy module;
a device information module operative with the protocol engine module and front-end proxy module; and
a configuration file database for storing configuration files used for configuring the front-end proxy module based on the determined functional features of the wireless mobile communications device, said configuration file database operatively connected to said device information module and allowing said device information module to query said configuration file database; and selecting a configuration file for configuring the front-end proxy module to interface with the wireless mobile communications device and enable communications of any desired alerts that are notifications indicative of an event.

10. A communications system according to claim 9, wherein said device information module is operative for determining functional features of the wireless mobile communications device by intermediate proxies and header information.

11. A communications system according to claim 9, wherein said device information module is operative for determining which functional features are enabled for different wireless mobile communications devices.

12. A communications system according to claim 9, wherein said device information module is operative for determining the brand of the wireless mobile communications device.

13. A communications system according to claim 9, wherein said database includes data relating to the device type and brand of different wireless mobile communications devices.

14. A communications system according to claim 9, wherein said database includes data relating to unknown devices used for selecting a default configuration.

15. A communications system according to claim 9, wherein said device information module is operative for selecting a default configuration for unknown devices.

16. A communications system according to claim 9, wherein said data storage devices comprise servers that store email messages.

17. A method of communicating with a wireless mobile communications device comprising the steps of:
receiving communications from a wireless mobile communications device within a front-end proxy module that can communicate using different operating protocols and with a plurality of data storage devices using respective ones of the different operating protocols;
determining functional features of the wireless mobile communications device by querying a knowledge database that stores data relating to functional features of different wireless communications devices that can communicate with the front-end proxy module;
loading a configuration file to the front-end proxy module from a device information module operatively connected to the front-end proxy module by querying a configuration file database that stores configuration files used for configuring the front-end proxy module based on functional features of the mobile wireless communications device; and
configuring a communications interface with the wireless mobile communications device based on the determined functional features to enable communications of any desired alerts that are notifications indicative of an event to the wireless mobile communications device, the event being based upon at least a commercial brand name of a corresponding one of the plurality of wireless mobile communications devices.

18. A method according to claim 17, and further comprising the step of determining functional features of the wireless communications device by reviewing intermediate proxies and header information received from the wireless mobile communications device.

19. A method according to claim 17, and further comprising the step of configuring a WAP gateway through which alerts are sent to the wireless mobile communications device.

20. A method according to claim 17, wherein the step of determining functional features of the wireless mobile communications device comprises the step of identifying the commercial brand name of the wireless mobile communications device.

21. A method according to claim 20, and further comprising the step of matching a communications template with the commercial brand name of the wireless mobile communications device.

22. A method according to claim 17, and further comprising the step of selecting a default configuration file when a wireless mobile communications device is unrecognized.

23. A method according to claim 17, and further comprising the step of storing information regarding the wireless mobile communications device for future processing when further features of a wireless mobile communications device are obtained.

24. A computer-readable medium for interfacing at least one wireless mobile communications device and a data storage device comprising:
a front-end proxy module operative as an agent for communicating with a plurality of mobile wireless communications devices using at least one different operating protocol and with a plurality of data storage devices using respective ones of different operating protocols; and a knowledge database operatively connected to said front-end proxy module and storing data relating to functional features of different wireless mobile communication devices that can communicate with the front-end proxy module;

a device information module operative with the front-end proxy module; and a configuration file database for storing configuration files used for configuring the front-end proxy module based on functional features of the wireless mobile communications device, said configuration file database operatively connected to said device information module and allowing said device information module to query said configuration file database; and selecting a configuration file for configuring the front-end proxy module to interface with the wireless mobile communications device and enable communications of any desired alerts that are notifications indicative of an event based upon at least a commercial brand name of a corresponding one of the plurality of wireless mobile communications devices.

25. A computer-readable medium according to claim 24, and further comprising a protocol engine module for communicating with a plurality of data storage devices using respective operating protocols.

* * * * *